United States Patent [19]

Hamanaka et al.

[11] Patent Number: 5,055,435

[45] Date of Patent: Oct. 8, 1991

[54] CERAMIC MATERIALS TO BE INSERT-CAST

[75] Inventors: Toshiyuki Hamanaka, Suzuka; Takashi Harada, Nagoya; Fumio Hattori, Ichinomiya, all of Japan

[73] Assignee: NGK Insulators, Ltd., Aichi, Japan

[21] Appl. No.: 508,532

[22] Filed: Apr. 12, 1990

Related U.S. Application Data

[63] Continuation of Ser. No. 169,507, Mar. 17, 1988, abandoned.

[30] Foreign Application Priority Data

| Mar. 24, 1987 | [JP] | Japan | 62-70113 |
| Apr. 27, 1987 | [JP] | Japan | 62-63765[U] |
| Apr. 27, 1987 | [JP] | Japan | 62-63766[U] |
| Apr. 27, 1987 | [JP] | Japan | 62-63767[U] |
| Apr. 27, 1987 | [JP] | Japan | 62-104055 |

[51] Int. Cl.$^5$ .................................................. C04B 35/46
[52] U.S. Cl. .................................. 501/134; 501/127; 501/128; 501/136; 501/153
[58] Field of Search ............... 501/127, 128, 134, 136, 501/153

[56] References Cited

U.S. PATENT DOCUMENTS

| 2,745,437 | 5/1956 | Comstock . | |
| 3,173,451 | 3/1965 | Slayer . | |
| 3,568,723 | 3/1971 | Sowards . | |
| 3,578,471 | 5/1971 | Lachman | 501/119 |
| 3,709,772 | 7/1971 | Rice . | |
| 3,825,653 | 7/1974 | Duerksen et al. | 501/134 |
| 3,890,140 | 6/1975 | Asbury | 501/134 |
| 4,118,240 | 10/1978 | Takabatake | 501/134 |
| 4,248,440 | 2/1981 | McCormick | 501/127 |
| 4,277,539 | 7/1981 | Keller et al. . | |
| 4,307,198 | 12/1981 | Oda et al. | 501/134 |
| 4,483,944 | 11/1984 | Day et al. | 502/527 |
| 4,604,779 | 8/1986 | Narita et al. . | |
| 4,895,815 | 1/1990 | Olapinski et al. | 501/128 X |

FOREIGN PATENT DOCUMENTS

| 0107268 | 5/1984 | European Pat. Off. . |
| 0119499 | 9/1984 | European Pat. Off. . |
| 0141540 | 5/1985 | European Pat. Off. . |
| 0146731 | 7/1985 | European Pat. Off. . |
| 0279904 | 8/1988 | European Pat. Off. . |
| 3149775 | 6/1983 | Fed. Rep. of Germany . |
| 2408557 | 10/1978 | France . |
| 58-167848 | 10/1983 | Japan . |
| 58-190537 | 11/1983 | Japan . |
| 61-89963 | 5/1986 | Japan . |
| 59-211064 | 5/1986 | Japan . |
| 8300189 | 1/1983 | PCT Int'l Appl. . |

OTHER PUBLICATIONS

Sprechsaal, vol. 118, No. 12 by Dr. Ch. Hahn, Selb, D.

*Primary Examiner*—Darl Group
*Attorney, Agent, or Firm*—Parkhurst, Wendel & Rossi

[57] ABSTRACT

Ceramic materials to be insert-cast are disclosed, which each contain not less than 65% by volume of aluminum titanate as a crystalline phase, and have an average particle diameter of crystals thereof being not less than 10 μm, Young's modulus of 50 to 2,000 kgf/mm$^2$, compression strength of 5 to 40 kgf/mm$^2$, and porosity of 5 to 35%. Ceramic port liners are also disclosed, which are free from cracking due to compression force during insert-casting, peeling-off during use, and facilitate insert-casting. To attain this, a reinforcement which meets either one or both of requirements that differences in coefficient of thermal expansion at 800° C. and Young's modulus between the reinforcement and a material constituting the port liner body are in a range of ±0.1% and in a range of ±1,000 kgf/mm$^2$, respectively, is filled into a depressed portion at an outer peripheral surface of the port liner body to form an integrated structure with a flat or swelled surface. Alternatively, the outer peripheral surface of the port liner body is worked to give uneven portions at a joining surface of the port liner body to a metal to insert-cast the port liner. Another alternative is to utilize a stress-releasing slit formed in a wall of the port liner body. Further, the outer peripheral surface of the ceramic port liner body may be covered with a ceramic sheet which is irreversibly expandable by heating.

4 Claims, 7 Drawing Sheets

FIG_1

FIG_2

FIG_4

FIG_5

FIG_6

FIG_7

FIG_8

FIG_9

FIG_10

FIG_11

FIG_12

CERAMIC MATERIALS TO BE INSERT-CAST

This is a continuation of application Ser. No. 07/169,507 filed Mar. 17, 1988, now abandoned.

BACKGROUND OF THE INVENTION (1) Field of the Invention

This present invention relates to ceramic materials to be used when hollow tubular ceramic members are to be insert-cast with a molten metal such as aluminum or cast iron. Particularly, the invention relates to ceramic materials to be used for insertcasting when inner surfaces of exhaust ports in gasoline engines, diesel engines or the like are to be lined. Further, the invention relates to ceramic port liners used to line inner surfaces of exhaust ports in gasoline engines, diesel engines or the like.

(2) Related Art Statement

Environmental pollution with exhaust gases from automobiles has become a serious social problem, and poisonous substances contained therein have mainly been removed by catalysts. From the standpoint of resources and costs, consumption amounts of noble metals such as Pt or Rh used as these catalysts have been demanded to be reduced. In addition, recently increasing 4 valve type engines have a problem in that purifying performance of catalysts is deteriorated due to reduction in temperatures of exhaust gases. As one technique for solving these problems, it has conventionally been proposed that temperatures of exhaust gases are raised by a thermally insulating action of ceramic port liners which are lined to inner surfaces of engine exhaust ports. In general, in order to fit ceramic port liners to engine exhaust ports, the ceramic port liners are insert-cast with a metal such as aluminum simultaneously when engine cylinder heads are produced. However, great compression stresses act due to shrinkage through solidification of the molten metal. Thus, there is a problem in that when stresses locally concentrate upon even a high strength ceramic material, the ceramic portion is broken.

On the other hand, Japanese patent publication Nos. 46; 26,330, 51-16,168, 60-5,544 and 56-7,996 propose ceramic materials used for hollow tubular members to be insert-cast with a metal.

Japanese patent publication No. 46-26,330 relates to an invention in which a ceramic member made of high strength alumina-based or silicon carbide based ceramic material is made porous at its surface portion to withstand shrinkage of a metal during cooling. However, such a composite material is in a yielded state in which fine cracks are latently present. Consequently, if such a composite material is used at a portion undergoing vigorous vibration, in such as in an engine, it is feared that the cracks proceed to conspicuously deteriorate durability.

Japanese patent publication No. 51-16,168 relates to an invention for producing heat insulating cast products having a low elastic modulus. The cast products are made of flexible ceramic semi-products consisting of a refractory filler and alumina cement, and their values of elastic modulus are 950 kg/mm$^2$ at the minimum. Thus, they may be broken due to compression stresses during insert-casting.

Japanese patent publication No. 60-5,544 is aimed at low thermal expansion (thermal shock resistance) and high strength by adding kaolin and magnesium silicate to aluminum titanate. However, the minimum elastic modulus is $8 \times 10^3$ kgf/mm$^2$. Thus, breakage due to compression stress during insert-casting cannot completely be prevented by this method.

Japanese patent publication No. 56-7,996 is to afford low thermal expansion and high strength to aluminum titanate by adding SiO$_2$ and ZrO$_2$ thereto. Growth of crystalline grains of aluminum titanate is restrained by these additives. However, this method also has the above-mentioned shortcoming possessed by the prior art techniques.

In addition to the above-mentioned prior art methods, many attempts have been made to mitigate compression stresses due to a molten metal during shrinkage in solidifying by coating the outer periphery of a ceramic member with a layer of asbestos, ceramic fibers made of alumina or the like to be interposed as a buffer member between the metal and the ceramic member by utilizing an elastic force possessed by the layer (for instance, Japanese patent application Laid-open Nos. 52-121,114 and 59-175,693). However, since the outer periphery of the ceramic member is coated with the ceramic fibers, a final product is more costy due to an increased number of steps. Furthermore, this method has a serious problem in that if elasticity of the ceramic fiber layer is lost due to high temperatures and vibrations during engine operation, the port liner is peeled off from the metal member.

Further, Japanese patent application Laid-open No. 60-169,655 proposes hollow tubular ceramic members in which at least one high pressure-proof reinforcement is provided around the outer peripheral surface thereof. Since such ceramic members use tialite (aluminum titanate) and zirconia as ceramic bodies and the reinforcement, respectively, differences in thermal expansion and Young's modulus between them are so great that the ceramic members cannot withstand thermal shock and stress and are broken when insert-cast with aluminum.

Moreover, many attempts have also been proposed to prevent such breakage by making port liners themselves of a high strength material. However, since an extremely great stress is concentrated upon a depressed portion such as a central portion of a two barrel type port liner used in a four valve type engine, in which the outer surface is depressed inside, cracking cannot completely be prevented there.

SUMMARY OF THE INVENTION

The present invention has been accomplished to obviate the above-mentioned problems encountered by the prior art techniques, and to provide ceramic materials to be insert-cast, which have excellent heat resistance and thermal shock resistance, and are free from cracking due to compression stress developed during insert-casting.

It is another object of the present invention to solve the above-mentioned problems encountered by the prior art techniques, and to provide ceramic port liners which are free from cracking due to compression stresses developed during insert-casting, do not peel off during use, and can easily be insert-cast.

Although previous research has been performed to increase strength of ceramic members by refining crystalline grains, the present inventors have found through repeated research to accomplish the above objects that port liners can be prevented from cracking during insert-casting with a metal by affording rubbery elasticity upon the port liners through lowering Young's modulus instead of further increasing strength. The present invention has been accomplished based on this knowledge, and is characterized in that aluminum titanate is contained as a crystalline phase in an amount of not less than 65% by volume, the average particle diameter of crystals thereof is not less than 10 μm, Young's modulus is in a range from 50 to 2,000 kgf/mm$^2$, compression strength is in a range from 5 to 40 kgf/mm$^2$, and porosity is in a range from 5 to 35%.

Further, the present inventors have found that through repeated research to solve the above-mentioned problems that breakage of the ceramic member due to compression stress during insert-casting is more conspicuous when the port liner is peeled from the insert-casting metal and that the stress concentration is mitigated by preventing the peeling to remarkably reduce occurrence of cracks.

The port liners according to the present invention are characterized in that each of the port liners is designed as an integral structure with a flat or swelled surface portion by filling a reinforcement in a depressed portion of at the outer peripheral surface of a ceramic port liner body, the reinforcement meeting either one or both of requirements that difference in coefficient of thermal expansion at 800° C. between a material constituting the port liner body and the reinforcement is in a range of ±0.1% and that difference in Young's modulus therebetween is in a range of ±1,000 kgf/mm$^2$.

According to another aspect of the present invention, there is a provision of ceramic port liners characterized in that the outer peripheral portion of a ceramic port liner body is worked to afford uneven portions upon a contacting face of the port liner body to an insert-casting metal.

According to a further aspect of the present invention, there is a provision of ceramic port liners characterized in that a ceramic port liner body possesses a depressed portion at its outer peripheral surface and a slit is formed in a wall of the port liner body for releasing stress.

According to a still further aspect of the present invention, there is a provision of ceramic port liners characterized in that the outer peripheral surface of a ceramic port liner body is covered with a ceramic sheet which is irreversively expandable by heating.

These and other objects, features, and advantages of the present invention will be appreciated upon reading of the following description of the invention when taken in conjunction with the attached drawings, with the understanding that some modifications, variations, and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein.

DETAILED DESCRIPTION OF THE INVENTION

First, a process for producing ceramic materials according to the present invention will be explained as follows:

Raw ingredients are selected from the group comprising alumina, low soda alumina, calcined bauxite, purified rutile, crude rutile, anatase type titanium, ilmenite, ferrite, rouge, magnesia, magnesite, spinel, kaolin, quartz, and silica to prepare a raw material having a chemical composition essentially consisting of, in terms of "weight", from 40 to 65% of $Al_2O_3$, from 30 to 60% of $TiO_2$, and at least one kind of $SiO_2$, MgO, and $Fe_2O_3$ in a total amount of not more than 10%. To this raw material is added 0.1 to 1.0% of a deflocculant selected from water glass, ammonium polycarbonate, an amine, sodium pryrophosphate, and the like. After 1.0 to 5.0% of a binder selected from PVA, MC, CMC, acrylate, and the like is added to the mixture, the resulting mixture is fully mixed and stirred together with 15 to 40% of water by means of a trommel, a ball mill or the like, thereby preparing a slurry having a viscosity of 200 to 1,000 cp. The thus obtained slurry is shaped in a cylindrical or port liner form by a casting method, which is dried and fired. Consequently, an aluminum titanate sintered body which contains not less than 65% by volume of aluminum titanate as a crystalline phase and at least one kind of rutile, covundum, and mullite as other crystalline phases and has excellent heat resistance, thermal shock resistance, and heat insulation can be obtained. Contrary to the conventional common knowledge, according to the present invention, the crystals of aluminum titanate are fully grown up to the average particle diameter of not less than 10 μm by setting firing conditions to be, for instance, in a temperature range from 1,450° to 1,650° C., preferably in a range from 1,500° to 1,600° C., for around 1 to 16 hours. While coefficients of thermal expansion of the aluminum titanate crystals in a- and b-axes are positive, that of a c-axis is negative. Since difference in coefficient of thermal expansion between them are very great, grain boundaries and crystals themselves do not withstand differences in thermal expansion among the axes, so that a number of microcracks are formed between or inside the crystal grains.

It was found that when the crystal grains of aluminum titanate are grown to the average diameter of not less than 10 μm, the frequency and size of occurrence of microcracks correspond to remarkable reduction in Young's modulus. Therefore, as a result of the growth of such crystal grains, a huge number of microcracks are formed between or inside the crystal grains. Thus, such aluminum titanate has the property that spaces inside microcracks approach together or separate from one another due to application of external forces, so that Young's modulus of 50 to 2,000 kgf/mm$^2$, compression strength of 5~40 kgf/mm$^2$, and porosity of 5 to 35% can be afforded to the thus obtained ceramic material. Ceramic materials as having such a low Young's modulus can shrink together with an insert-casting metal simultaneously when the metal shrinks. Particularly in the case of such a complicated shape that breaks conventional ceramics of high strength and high Young's modulus due to concentration of stresses, the ceramic material according to the present invention is free from cracking. Therefore, the ceramic materials according to the present invention are favorably used as, not to speak of cylindrical type port liners, a port liner 3 of a complicated shape shown in FIGS. 1 and 2, which has two ports 2 on a cylinder side of a four valve type engine and a single exhaust opening 1 on an exhaust manifolds side. Further, the ceramic material of the invention is also favorably used as liners in exhaust manifolds. The coefficient of thermal expansion of the sintered body is lowered by microcracks contained therein, so that satisfactory heat insulation is exhibited even when porosity is relatively small.

Since aluminum titanate has a melting point of not less than 1,700° C., no particular limitation is posed upon an insert-casting metal. For instance, gray cast iron, nodular graphite cast iron, white cast iron, aluminum alloys, copper alloys, magnesium alloys, and zinc alloys may be used for insert-casting.

Figure 3A:
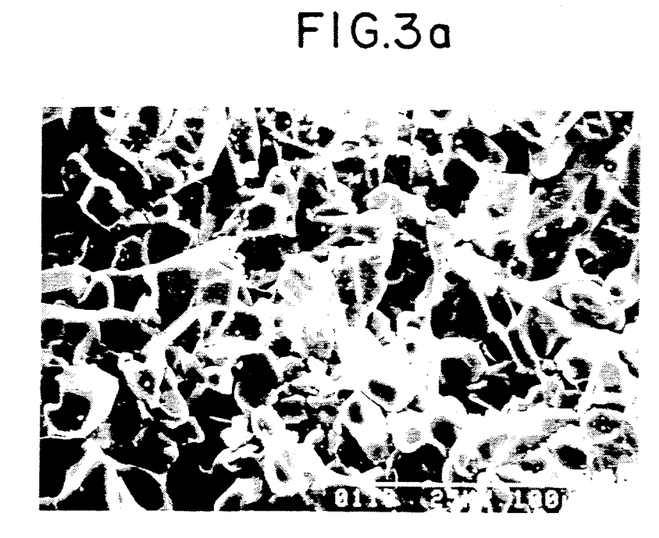
FIGS. 3a and 3b are electron microscope photographs of ceramic materials according to the present invention.
Figure 3B:
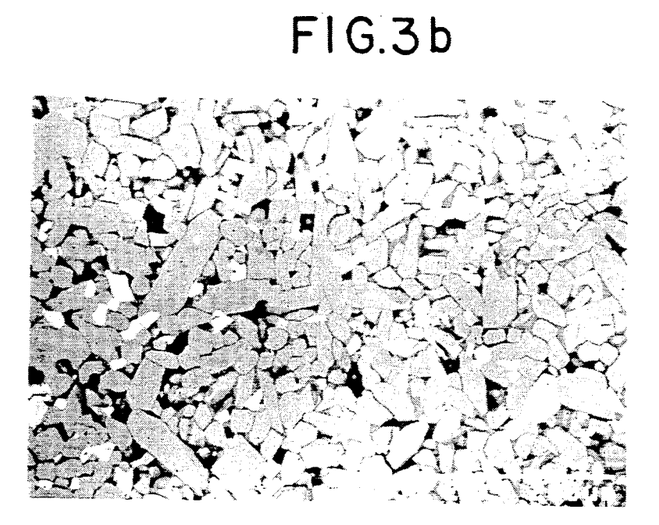

FIGS. 3(a) and 3(b) show electron microscope photographs of ceramic materials according to the present invention. In FIG. 3(b), white crystals are rutile, grey crystals are aluminum titanate, and black portions are pores.

Reason for numerical limitations in the present invention are as follows.

First, the reason why the amount of aluminum titanate in the crystalline phase is not less than 65% by volume and the average particle diameter is not less than 10 $\mu$ is that if a ceramic material does not satisfy these requirements, its Young's modulus cannot fully be lowered and thus the object of the present invention cannot be attained.

The reason why Young's modulus is set at from 50 to 2,000 kgf/mm$^2$ is that a ceramic material having Young's modulus of less than 50 kgf/mm$^2$ is difficult to produce, while that having Young's modulus of more than 2,000 kgf/mm$^2$ tends to crack like conventional ceramic materials. Particularly, it is preferable that Young's modulus is controlled to be in a range from 50 to 200 kgf/mm$^2$.

The reason why compression strength is set at from 5 to 40 kgf/mm$^2$ is that if it is less than 5 kgf/mm$^2$, the ceramic material may be deformed during insert-casting and also has a handling problem, while if it is over 40 kg/mm$^2$ to the contrary, Young's modulus exceeds 2,000 kgf/mm$^2$.

The reason why the porosity is set at from 5 to 30% is that if it is less than 5%, a satisfactory heat insulating effect cannot be obtained, while if it is more than 30%, both strength and Young's modulus fall outside the respective numerical limitations in the present invention.

The reason why the ceramic material contains from 40 to 65% of $Al_2O_3$ and from 30 to 60% of $TiO_2$ in its composition is that if the composition falls outside these limitations, the amount of the crystals of aluminum titanate does not reach 65%. On the other hand, the reason why at least one of $SiO_2$, $MgO$, and $Fe_2O_3$ is limited to not more than 10% in a total amount is that if it is more than 10%, the rate of the aluminum titanate crystals does not reach 65% and/or the crystal particle diameter is less than 10 $\mu$m.

The ceramic material according to the present invention has a coefficient of thermal expansion of not more than $2.0 \times 10^{-6}$/°C. (40~800° C.) and heat conductivity of 0.8 to $5.0 \times 10^{-3}$ cal/cm.sec.°C. These physical properties are preferred with respect to port liners to be brought into direct contact with exhaust gases at high temperatures.

Next, examples of a first aspect of the present invention will be given below.

Raw materials were prepared to have a composition in any one of Run Nos. 1~25 in Table 1 given later, and cast in a mold to prepare test pieces each having an elliptical section of 3 mm in thickness, 64 mm in a major axis and 36 mm in minor axis. Each of the test pieces thus obtained was fired in firing conditions given in Table 1, and physical properties of the obtained ceramic materials were measured. Next, a casting sand was charged into each of the test pieces, which was then insert-cast with aluminum. Thereby, metal-ceramic composite bodies each having an aluminum thickness of 7 mm were produced. After the casting sand was removed, the test pieces were checked as to whether they cracked or not. Results are shown in the lowermost row.

TABLE 1

| | Example | | | | | | | | | |
|---|---|---|---|---|---|---|---|---|---|---|
| Run No. | 1 | 2 | 3 | 4 | 5 | 6 | 7 | 8 | 9 | 10 |
| Chemical composition (wt %) | | | | | | | | | | |
| $Al_2O_3$ | 43.3 | 49.2 | 54.2 | 56.1 | 58.0 | 62.9 | 55.5 | 51.6 | 54.2 | 51.6 |
| $TiO_2$ | 53.4 | 47.5 | 42.5 | 40.6 | 38.7 | 33.8 | 43.5 | 40.4 | 42.5 | 40.4 |
| $Fe_2O_3$ | 3.3 | 3.3 | 3.3 | 3.3 | 3.3 | 3.3 | 1.0 | 8.0 | — | — |
| MgO | — | — | — | — | — | — | — | — | 3.3 | 8.0 |
| $SiO_2$ | — | — | — | — | — | — | — | — | — | — |
| firing temperature (°C.) | 1,550 | 1,550 | 1,550 | 1,550 | 1,550 | 1,550 | 1,550 | 1,550 | 1,550 | 1,550 |
| Young's modulus (kgf/mm$^2$) | 1,210 | 520 | 100 | 180 | 1,470 | 1,860 | 60 | 340 | 190 | 1,380 |
| compression strength (kgf/mm$^2$) | 22 | 16 | 9 | 13 | 24 | 37 | 7 | 18 | 12 | 30 |
| Porosity (%) | 6.2 | 7.2 | 9.0 | 11.5 | 13.6 | 14.9 | 13.6 | 7.1 | 9.1 | 6.4 |
| AT average crystalline diameter ($\mu$m) | 14 | 18 | 20 | 18 | 15 | 12 | 24 | 21 | 18 | 21 |
| AT crystal amount | 84 | 88 | 94 | 94 | 90 | 85 | 96 | 88 | 91 | 85 |

TABLE 1-continued

| vol (%) | | | | | | | | | | |
|---|---|---|---|---|---|---|---|---|---|---|
| CTE ($\times 10^{-6}/°C$) | −0.9 | −1.1 | −1.2 | −1.0 | 0.1 | 1.2 | −1.0 | −1.4 | −1.3 | −1.6 |
| Thermal conductivity ($\times 10^{-3}$ cal/cm · s · °C) | 1.6 | 1.2 | 1.1 | 1.1 | 1.4 | 1.5 | 0.9 | 1.7 | 1.0 | 1.9 |
| Crystalline phase other than AT | rutile | rutile | — | — | corundum | corundum | — | — | — | — |
| Cracks | no | no | no | no | no | no | no | no | no | no |

| | Example | | | | | | | | | |
|---|---|---|---|---|---|---|---|---|---|---|
| Run No. | 11 | 12 | 13 | 14 | 15 | 16 | 17 | 18 | 19 | 20 |
| Chemical composition (wt %) | | | | | | | | | | |
| $Al_2O_3$ | 55.5 | 51.6 | 54.3 | 54.3 | 54.2 | 57.7 | 61.6 | 54.2 | 54.2 | 54.3 |
| $TiO_2$ | 43.5 | 40.4 | 42.5 | 42.5 | 42.5 | 39.5 | 28.5 | 42.5 | 42.5 | 42.5 |
| $Fe_2O_3$ | — | — | 1.6 | — | 1.1 | — | — | 3.3 | 3.3 | 1.6 |
| MgO | — | — | — | 1.6 | 1.1 | — | — | — | — | — |
| $SiO_2$ | 1.0 | 8.0 | 1.6 | 1.6 | 1.1 | 2.8 | 9.9 | — | — | 1.6 |
| firing temperature (°C) | 1,550 | 1,550 | 1,550 | 1,550 | 1,550 | 1,600 | 1,600 | 1,500 | 1,600 | 1,600 |
| Young's modulus (kgf/mm$^2$) | 70 | 590 | 100 | 140 | 130 | 160 | 1,630 | 1,680 | 50 | 60 |
| compression strength (kgf/mm$^2$) | 7 | 21 | 9 | 11 | 11 | 13 | 38 | 16 | 5 | 6 |
| Porosity (%) | 13.9 | 5.1 | 9.3 | 9.4 | 9.0 | 8.6 | 12.1 | 33.9 | 5.1 | 6.4 |
| AT average crystalline diameter (μm) | 20 | 20 | 20 | 19 | 19 | 21 | 11 | 10 | 27 | 25 |
| AT crystal amount vol (%) | 97 | 89 | 93 | 90 | 93 | 89 | 65 | 67 | 95 | 94 |
| CTE ($\times 10^{-6}/°C$) | −1.1 | −1.5 | −1.3 | −1.4 | −1.5 | −0.9 | 0.2 | 0.7 | −1.3 | −1.3 |
| Thermal conductivity ($\times 10^{-3}$ cal/cm · s · °C) | 0.8 | 1.6 | 1.1 | 1.2 | 1.2 | 1.4 | 4.6 | 2.6 | 1.0 | 0.8 |
| Crystalline phase other than AT | — | — | — | — | — | mullite | mullite | — | — | — |
| Cracks | no | no | no | no | no | no | no | no | no | no |

| | Comparative Example | | | | |
|---|---|---|---|---|---|
| Run No. | 21 | 22 | 23 | 24 | 25 |
| Chemical composition (wt %) | | | | | |
| $Al_2O_3$ | 38.7 | 67.7 | 62.4 | 54.2 | 54.3 |
| $TiO_2$ | 58.0 | 29.0 | 26.3 | 42.5 | 42.5 |
| $Fe_2O_3$ | 3.3 | 3.3 | — | 3.3 | 1.6 |
| MgO | — | — | — | — | — |
| $SiO_2$ | — | — | 11.3 | — | 1.6 |
| firing temperature (°C) | 1,550 | 1,550 | 1,600 | 1,450 | 1,450 |
| Young's modulus (kgf/mm$^2$) | 2,030 | 2,330 | 2,150 | 2,860 | 2,790 |
| compression strength (kgf/mm$^2$) | 36 | 45 | 46 | 8 | 9 |
| Porosity (%) | 6.2 | 17.0 | 13.2 | 41.3 | 3.8 |
| AT average crystalline diameter (μm) | 9 | 8 | 9 | 7 | 7 |
| AT crystal amount vol (%) | 76 | 74 | 56 | 52 | 50 |
| CTE ($\times 10^{-6}/°C$) | −0.7 | 2.2 | 0.4 | 2.5 | 2.9 |
| Thermal conductivity ($\times 10^{-3}$ cal/cm · s · °C) | 1.9 | 2.1 | 5.2 | 3.4 | 3.1 |
| Crystalline phase other than AT | rutile | corundum | mullite | rutile corundum | rutile corundum |
| Cracks | cracked | cracked | cracked | cracked | cracked |

Note: AT . . . aluminum titanate

As is clear in the above-mentioned explanation, the first aspect of the present invention is to provide ceramic materials which are formed in a hollow tubular shape suitable used to be insert-cast with a metal, having excellent heat resistance and thermal shock resistance, and free from occurrence of cracks due to deformation following compression stress developed during insert-casting. Thus, the ceramic materials according to the present invention are favorably employed as port liners or exhaust manifold liners which are brought into direct contact with exhaust gases at high temperatures. As mentioned later, the ceramic materials according to the present invention are preferable when a buffer material such as ceramic fibers is wound around the ceramic materials to be insert-cast, because elasticity of the buffer material is not lost. Thus, the present invention overcomes the problems possessed by the prior art techniques, and greatly contributes to industrial development.

Next, a second aspect of the present invention will be explained below.

Figure 1:
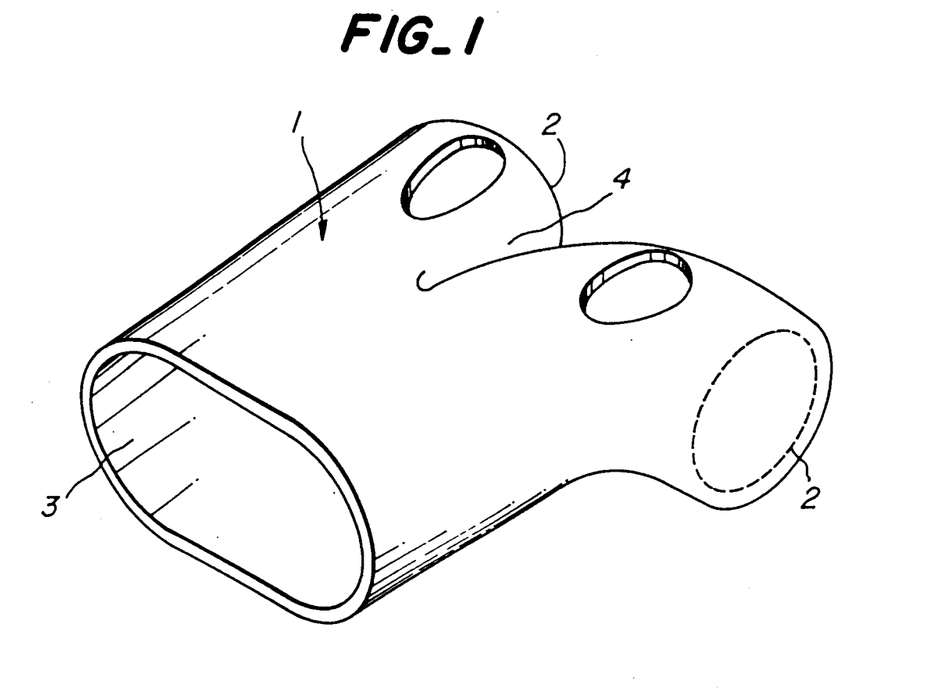
FIG. 1 is a perspective view of a port liner for use in a four valve type engine.
Figure 2:
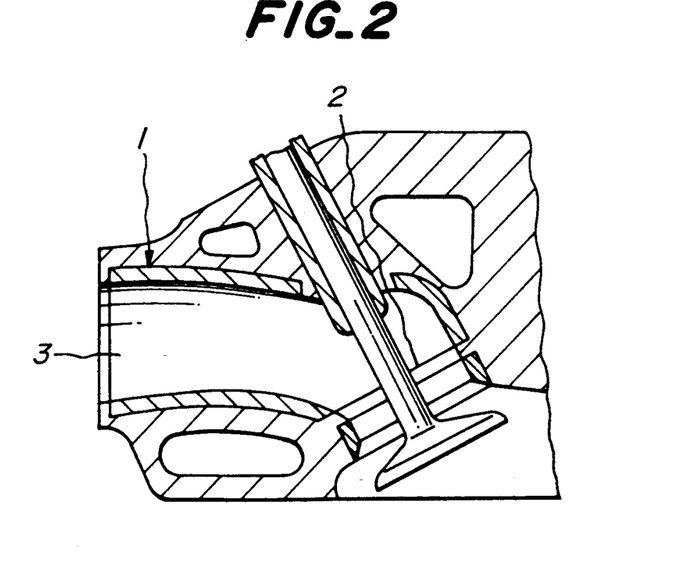
FIG. 2 is a sectional view of the port liner insert-cast into an engine head.
Figure 4:
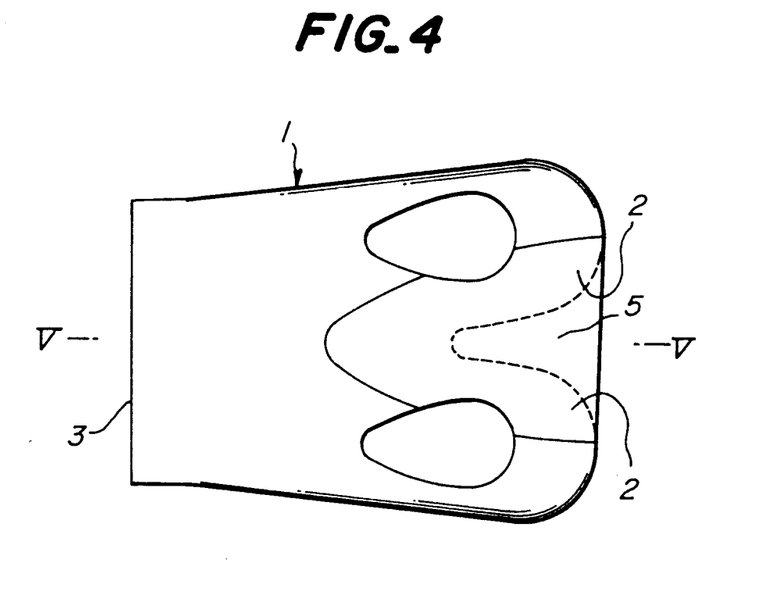
FIG. 4 is a plane view showing a ceramic port liner according to the second aspect of the present invention.
Figure 5:
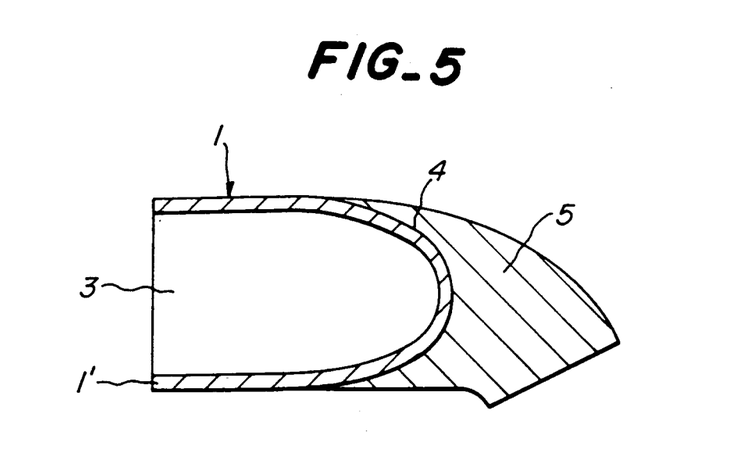
FIG. 5 is a sectional view of FIG. 4 along a line V—V.

As shown in FIG. 1, the conventional port liner 1 for a four valve type engine comprises two ports 2, 2, and a single exhaust opening 3, and a depressed portion 4 is formed at an intermediate portion between the ports 2, 2. To the contrary, according to the present invention, as shown in FIGS. 4 and 5, a reinforcement 5 is filled in the depressed portion 4 to integrally form an integral structure with a smoothly flattened surface.

As the reinforcement 5, a material of which coefficient of thermal expansion and Young's modulus are near those of the port liner body 1' is selected. This selection is made to satisfy either one or both of requirements that difference in coefficient of thermal expansion at 800° C. between the port liner body and the reinforcement falls in a range of ±0.1% and that difference in Young's modulus therebetween falls in a range of ±1,000 kgf/mm². For instance, when a material being mainly composed of aluminum titanate and having low Young's modulus of about 50 to 2,000 kgf/mm² and a coefficient of thermal expansion of −0.1 to +0.1% is used as the material of the port liner body 1', a slurry or a body which is mainly composed of aluminum titanate and has the same properties as those of the material of the port liner body is preferably used as the reinforcement 5. The reinforcement 5 is plastically deformed together with the port liner body 1' during insert-casting to mitigate stress concentration upon the depressed portion 4 of the port liner body 1'. To attain this, it is necessary that the port liner body 1' and the reinforcement 5 are completely joined together at the interface therebetween. For this purpose, it is preferable that the reinforcement 5 is made of the same material as that of the port liner body 1'. If differences in coefficient of thermal expansion and/or Young's modulus between the materials of the reinforcement 5 and the port liner body 1' fall outside the respectively limited ranges of the present invention, the reinforcement may peel from the port liner body due to thermal stress or the former may not plastically be deformed together with the latter.

In order to produce the ceramic port liner according to the present invention, a port liner body 1' having a given thickness is molded through casting, and its depressed portion 4 in a green body state is buried with a slurry or body of a reinforcement 5 before firing. Then, the molding with the slurry or body is fired to obtain an integrated structure. In the alternative, a fired port liner body 1' having a given thickness is set in a mold as a core, and a slurry of the reinforcement 5 is poured and cast outside thereof, followed by firing. Further, an integrated port liner having locally different thicknesses is shaped through pressure pouring by using a core and a mold having no depressed portion, or a similarly integrated port liner is formed by injection molding.

In the following, examples of port liners according to the second aspect of the present invention will be explained.

EXAMPLE 2

Each of port liner bodies having the physical properties shown in any one of Run Nos. 1–9 was obtained by slip cast molding a ceramic body through pouring, and a depressed portion of the obtained molding in a green state was buried with a paste of a reinforcement having the same properties as those of the ceramic body as in Run No. 1, followed by drying and then firing in a temperature range from 1,500° to 1,600° C. Then, after casting sand was charged inside each of the port liner bodies, the entire outer periphery was insert-cast with aluminum in a thickness of 7 mm. After the casting sand was removed, the molding was checked for cracks. As a result, it was revealed that run Nos. 1–5 having differences in Young's modulus and coefficient of thermal expansion falling inside the ranges respectively defined in the present invention were free from cracking, while run Nos. 6–9 all cracked.

EXAMPLE 3

In Example 3, port liner Run Nos. 1–9 were prepared and tested in the same manner as in Example 1 except that the same reinforcement as in Run No. 6 of Example 2 was used. While Run Nos. 1–4 cracked, Run Nos. 5–9 falling inside the scope of the present invention were free from cracking.

EXAMPLE 4

Each of port liners of Run Nos. 2, 4, 6, and 7 in Example 2 was set inside a mold as a core, and a slurry of aluminum titanate-mullite based reinforcement having Young's modulus of 3,200 kgf/mm² and a co-efficient of thermal expansion at 800° C. being 0.02% was poured between the mold and the port liner body. After drying and firing, thus obtained port liners were insert-cast with aluminum in the same manner as in Example 2. As a result, it was revealed that Run No. 2 cracked, while Run Nos. 4, 5 and 7 falling inside the scope of the present invention were free from cracking.

TABLE 2

| No. | Port liner bodies | | | | | | | | |
|---|---|---|---|---|---|---|---|---|---|
| | 1 | 2 | 3 | 4 | 5 | 6 | 7 | 8 | 9 |
| Young's modulus (kgf/mm²) | 60 | 100 | 190 | 520 | 1,210 | 1,860 | 1,480 | 1,340 | 1,950 |
| CTE (× 10⁻⁶/°C.) | −0.08 | −0.09 | −0.10 | −0.08 | −0.07 | 0.09 | 0.05 | 0.04 | 0.15 |
| Compression strength (kgf/mm²) | 7 | 9 | 12 | 16 | 22 | 37 | 16 | 20 | 38 |
| Porosity (%) | 14 | 9 | 9 | 7 | 6 | 15 | 34 | 21 | 10 |
| AT crystal amount (%) | 96 | 94 | 91 | 88 | 84 | 85 | 67 | 78 | 68 |
| AT average crystalline diameter (μm) | 24 | 20 | 18 | 18 | 14 | 12 | 10 | 13 | 12 |

As is clear from the aforegoing explanation, according to the second aspect of the present invention, stress concentrations occurring upon the depressed portion of the outer peripheral surface of the port liner body are prevented by designing the port liner as an integral structure in which the depressed portion is buried with the reinforcement having small differences in Young's modulus and coefficient of thermal expansion between them and integrally elastically deforming the entire port liner during insert-casting. Thus, the present invention has various merits in that the port liner will not crack due to compression stresses during insert-casting, and also is free from peeling-off during use as seen in conventional port liners around which ceramic fibers are wound, and can easily be insert-cast. Therefore, since the present invention provides ceramic port liners which obviate the problems possessed by the prior art techniques, it contributes to the industrial development to an extremely large extent.

Next, a third aspect of the present invention will be explained in more detail with respect to specific examples as follows.

Figure 6:
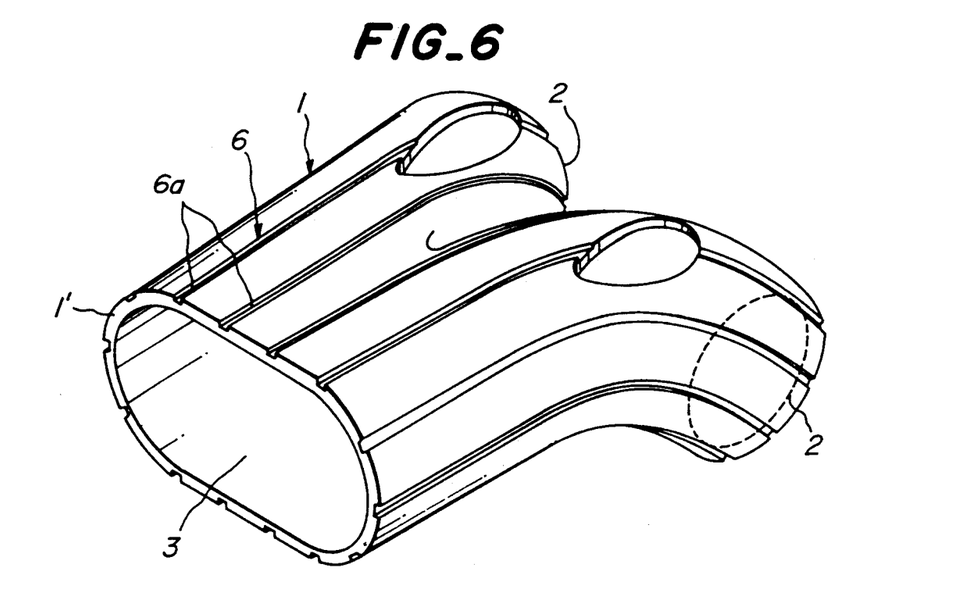
FIG. 6 is a perspective view of a ceramic port liner according to the third aspect of the present invention.

In FIG. 6, reference numeral 1' denotes a port liner body for use in a four valve type engine. The port liner body comprises two ports 2, 2 and a single exhaust opening 3. The port liner body 1' in this embodiment is made of a ceramic material of low Young's modulus which is mainly composed of aluminum titanate. More specifically, the ceramic material contains not less than 65% by volume of aluminum titanate as a crystalline phase, the average particle diameter of crystals thereof is not less than 10 μm, and Young's modulus, compression strength, and porosity are from 50 to 2,000 kgf/mm$^2$, 5 to 40 kgf/mm$^2$, and 5 to 35%, respectively.

According to the third aspect of the present invention, since worked portions are provided at the outer peripheral surface of the port liner body 1' to form an uneven surface upon a joining face of the ceramic port liner to the insert-casting metal. In this embodiment, the outer peripheral worked portion 6 is a groove 6a parallel with a flow direction of a gas passing through the port liner. Although depending upon the thickness of the port liner body, the width and depth of the groove are around 1 to 3 mm and around 0.5 to 3 mm, respectively. In order to prevent stress concentration, edge portions of the groove is preferably slightly curved. Some effect may be obtained by providing such grooves 6a at the depressed portion only where the port liner is likely to peel from the insertcasting metal. However, it is preferable that as in this embodiment, the grooves are formed over the entire outer peripheral surface of the port liner. Further, the grooves 6a may be formed in an oblique net-like fashion.

Figure 7:
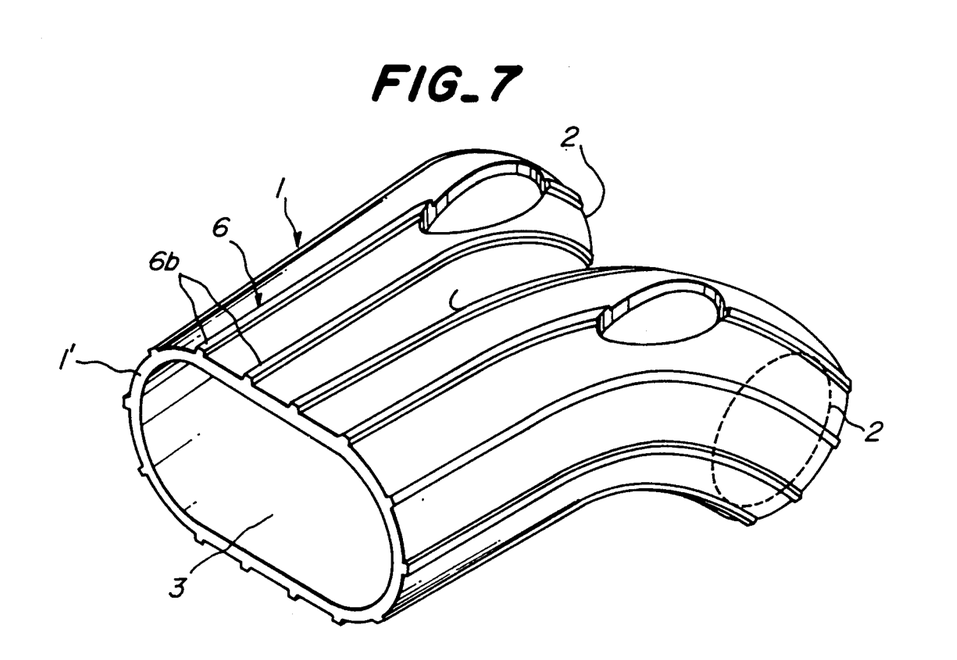
FIG. 7 is a perspective view of another ceramic port liner according to the third aspect of the present invention.

FIG. 7 shows a second embodiment of the third aspect of the present invention. In this embodiment, projections 6a are formed at the outer peripheral surface of the port liner body 1' as outer peripheral surface-worked portions 6. The projections 6b have a prismatic shape having a width of 1 to 3 mm and a height of 0.5 to 5 mm. With respect to the location and shape of the projections, they may be varied as in the first embodiment. If the upper portion of the projection 6b is enlarged, the insert-casting metal and the port liner body 1' are more firmly joined together.

The groove 6a or the projection 6b may be formed through a transferring technique by preliminarily forming corresponding projections or grooves on an inner surface of a mold used for molding port liner bodies through pouring.

Besides the above-mentioned grooves and projections, it is effective that the outer peripheral surface of the port liner is roughened. For instance, a roughness of 30 to 200 μm may be transferred upon the outer peripheral surface of the port liner by giving unevenness at roughness from about 30 to 200 μm on the inner surface of the mold. Such unevenness may be provided on the outer peripheral surface of the port liner by directly working it.

Furthermore, a granular material having the same properties as that of the port liner body 1' may be adhered onto the outer peripheral surface thereof as the outer peripheral surface-worked portions. Alternatively, numerous closed cells may be formed in the surface portion of the port liner body 1'.

In any of the above-mentioned techniques, uneven portions are formed on the joining surface of the port liner body to the insert-casting metal to enhance the joining force between the insert-casting metal and the port liner body.

As is the same with conventional ceramic port liners of this type, the thus constituted port liners according to the present invention are used in the state that they are insert-cast with a metal such as aluminum in the production of cylinder heads to improve heat insulation of exhaust ports. However, since the worked portions 6 are provided in the outer peripheral surface of the ceramic port liner according to the present invention to offer uneven portions to the joining face of the outer peripheral surface of the port liner body to the insert-casting metal, the insert-casting metal and the port liner body 1' are more firmly joined due to an anchoring effect of the outer peripheral surface-worked portion to prevent peeling off between them even during solidification of the insert-casting metal. Thus, as compared with the conventional ceramic port liners having suffered partial peeling-off from the insert-casting metal, stress concentration during the solidification is reduced to one half or less of the former so that cracking due to stress concentration can effectively be prevented. Moreover, different from conventional ceramic port liners around which buffer ceramic fibers are outwardly wound, the ceramic port liners according to the present invention have the merits in that the port liners are free from peeling-off during use and facilitate insert-casting.

As is clear from the aforegoing explanation, the ceramic port liners according to the present invention have the advantages in that they can of course fully exhibit inherent heat insulating effect, greatly reduce occurrence percentage of breakage due to compression force during insert-casting, are free from peeling-off during use, and facilitate insert-casting. Thus, since the present invention provides ceramic port liners which solve the problems possessed by the prior art techniques, the invention has a extremely great practical value.

Next, the fourth aspect of a present invention will be explained in more detail with reference to specific examples as follows.

Figure 8:
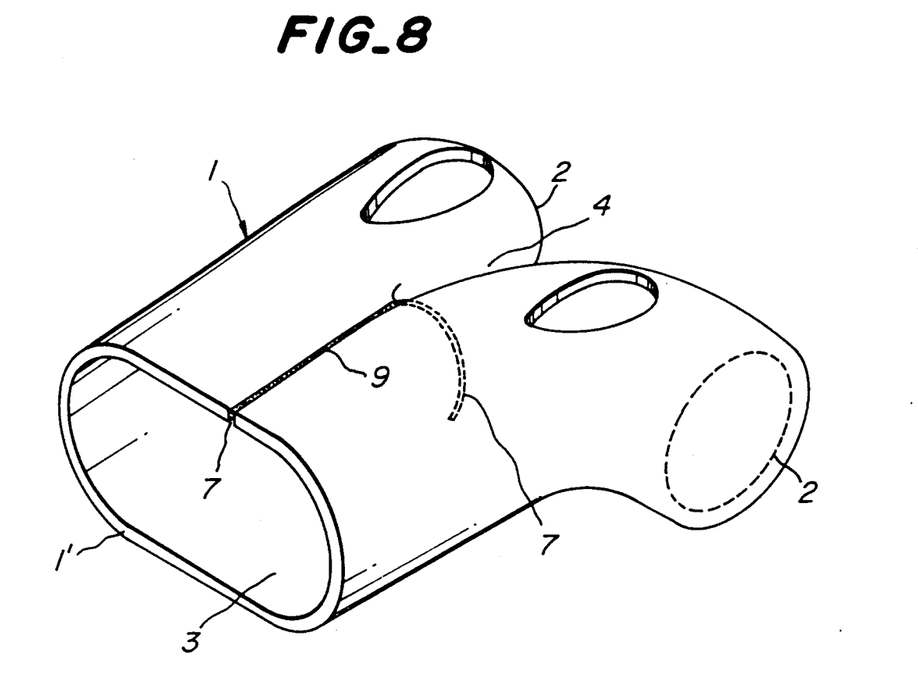
FIG. 8 is a perspective view of a ceramic port liner according to the fourth aspect of the present invention.

In FIG. 8, a port liner body 1 for a four valve type engine comprises two ports 2, 2 and a single exhaust opening 3. The port liner body 1' in this embodiment is made of a ceramic material which mainly consists of aluminum titanate and has low Young's modulus. More specifically, the ceramic material contains not less than 65% by volume of aluminum titanate as a crystalline phase, the average particle diameter of crystals thereof is not less than 10 μm, and Young's modulus, compression strength, and porosity are from 50 to 2,000 kgf/mm$^2$, from 5 to 40 kgf/mm$^2$, and from 5 to 35%, respectively.

A depressed portion 4 is formed at the outer peripheral portion of the port liner body 1' between two ports 2, 2. In this embodiment, a stress-releasing slit 7 is formed in a wall of the port liner body 1' facing the depressed portion 4. As shown in FIG. 8, the slit 7 of this embodiment is formed from an upper end face of the exhaust opening 3 to the lower portion of the depressed portion along a gas-flowing direction on a center line of the port liner body 1'.

Figure 9:
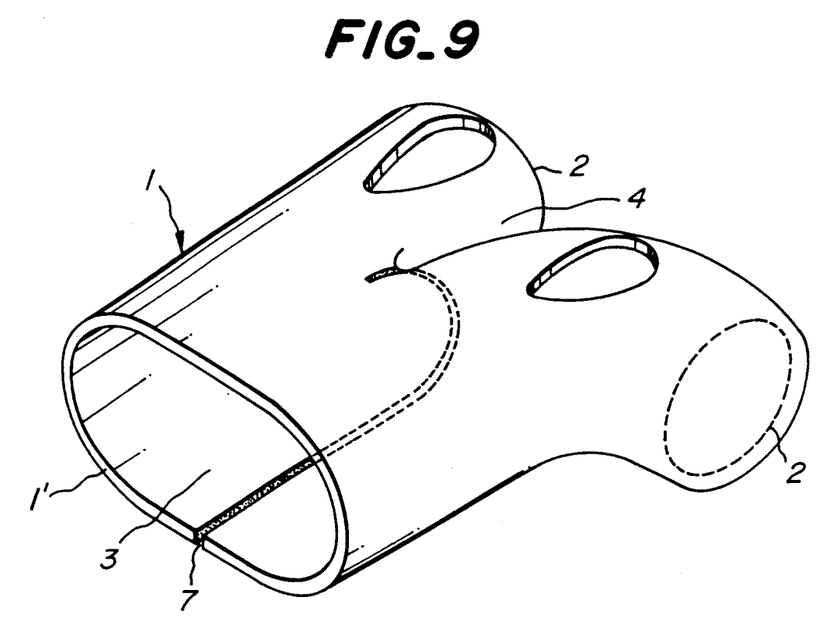
FIG. 9 is a perspective view of another ceramic port liner according to the fourth aspect of the present invention.
Figure 10:
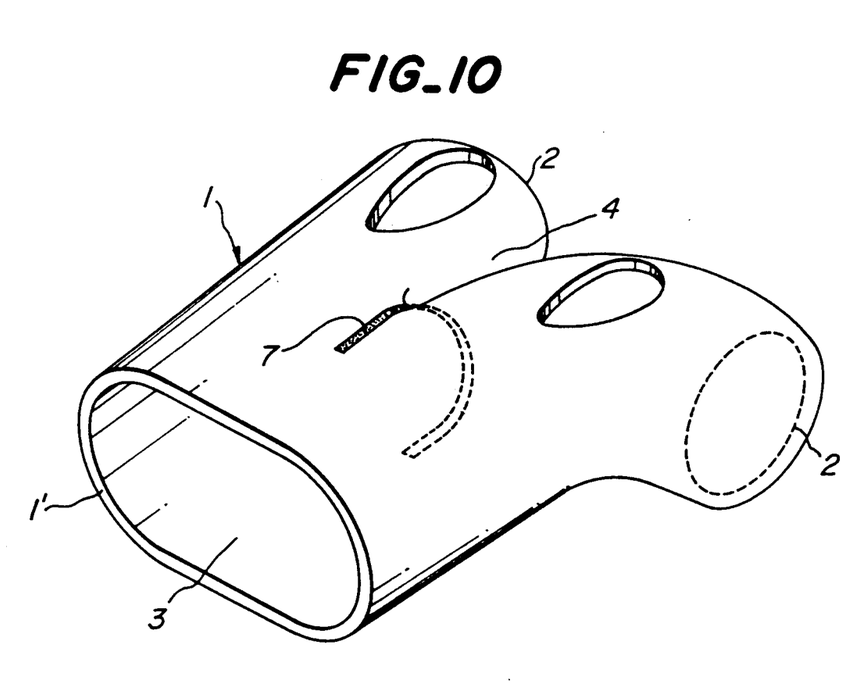
FIG. 10 is a further ceramic port liner according to the fourth aspect of the present invention.
Figure 11:
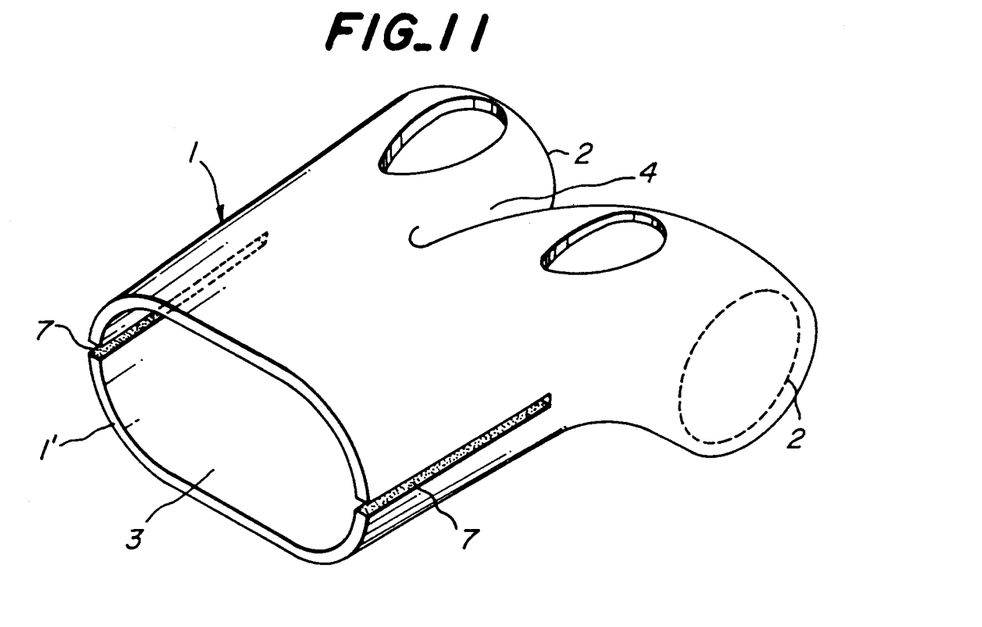
FIG. 11 is a still further ceramic port liner according to the fourth aspect of the present invention.

FIGS. 9, 10, and 11 show other embodiments of the port liners according to the present invention. As shown in the second embodiment of FIG. 9, a slit 7 may be formed from a lower end face of an exhaust opening to a upper portion of a depressed portion 4. Alternatively, as shown in FIG. 10, slits 7 may be formed extending only central portions of upper and lower walls of the port liner body facing a depressed portion 4. Moreover, as shown in the fourth embodiment of FIG. 11, slits 7 may be formed in right and left side walls of a port liner body 1'.

The width of the slits may be in a range from about 0.5 to 3 mm. It is preferable that ceramic fibers or the like having low Young's modulus are buried inside the slits 7. The ceramic fibers are buried to prevent a molten metal from entering the port liner. Thus, no limitation is posed upon the material, shape, burying way, etc. of the ceramic fibers. As is the same with conventional port liners of this type, the thus constituted port liners are insert-cast with a metal such as aluminum in the production of cylinder heads, and are used to improve heat insulation of inner faces of exhaust ports in the state. However, since a stress-releasing slit 7 is formed in the outer peripheral surface wall of the ceramic port liner according to the present invention, even when a great compression stress is exerted upon the port liner body 1' due to shrinkage of a molten metal through solidification during insert-casting, the port liner body 1' itself is deflected due to this slit to prevent stress concentration. Thus, the port liner can be prevented from cracking due to stress concentration. In particular, when a material which is mainly composed of aluminum titanate and has low Young's modulus is used as the port liners as in the case of the above embodiments, no cracks were observed even when the port liner was insert-cast with aluminum in a thickness of 5 cm. In addition, different from conventional ceramic port liners around which ceramic fibers are outwardly wound, the ceramic port liners according to the present invention are free from peeling-off during use, and facilitate insert-casting.

As is clear from the foregoing explanation, the port liners according to the fourth aspect of the present invention can of course can exhibit inherent heat insulating effect, completely prevent breakage due to compression stress during insert-casting, are free from peeling-off during use, and facilitate insert-casting. Thus, since the present invention provides ceramic port liners which solve the problems possessed by the prior art techniques, the invention has a practically great value.

Finally, the fifth aspect of a present invention will be explained with reference to a specific embodiment.

Figure 12:
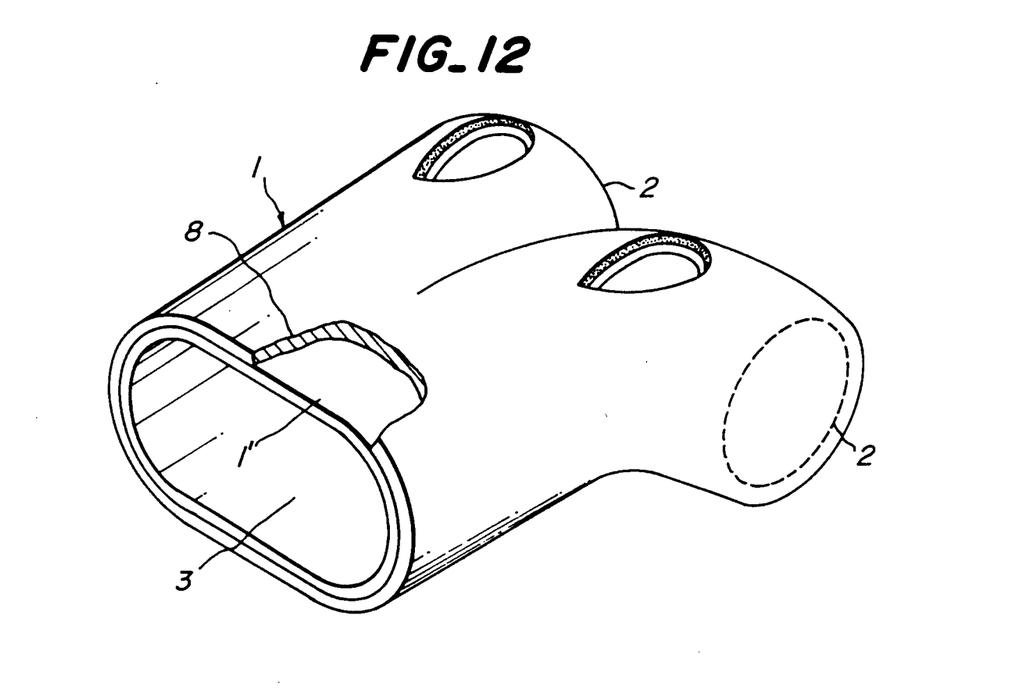
FIG. 12 is a ceramic port liner according to the fifth aspect of the present invention.

FIG. 12 shows a port liner for a four valve type engine as an embodiment of the fifth aspect of the present invention. The port liner comprises a port liner body 1' with two ports 2, 2 and a single exhaust opening 3. The port liner body 1' of this embodiment is made of a ceramic material containing aluminum titanate as a main ingredient and having low Young's modulus. More specifically, the ceramic material contains not less than 65% of aluminum titanate as a crystalline phase, the average particle diameter of crystals thereof is not less than 10 $\mu$pm, and the ceramic material has Young's modulus of 50 to 2,000 kgf/mm$^2$, compression strength of 5 to 40 kgf/mm$^2$, and porosity of 5 to 35%.

According to the fifth aspect of the present invention, the outer peripheral surface of the port liner body 1' is covered with a ceramic sheet 8 which irreversively expands by heating. As the ceramic sheet 8 exhibiting such a behavior, a mixture of a thermally expandable material such as vermiculite stone or vermiculite and a fine amount of an organic binder. For instance, a product commercially available under a trademark "Interam mat" from 3M may be used. Such a ceramic sheet having a thickness of 3 mm is expanded to a thickness of 5.5 mm by heating it at 700°. After that, even when the ceramic sheet is cooled down to 200° C., it maintains the thickness of not less than 4.5 mm. Further, the ceramic sheet exhibits an irreversive behavior. That is, even when it is subjected to repeated cycles between temperature rising up to 700° C. and cooling down to 200° C., the thickness does not substantially change, and is stabilized in a range from 4.5 to 5.0 mm. In the illustrated embodiment, the ceramic sheet is applied onto the entire outer peripheral surface of the port liner body 1'. However, such a ceramic sheet may be applied to only a portion of the port liner body, such as a depressed portion at an intermediate portion between two ports 2, 2 which particularly has weak strength because the outer peripheral surface is depressed.

When the ceramic port liner thus constituted according to the fifth aspect of the present invention is insert-cast with a molten metal such as aluminum in the production of a cylinder head, the ceramic sheet 8 applied around the outer peripheral surface of the port liner body 1' is expanded with heat possessed by the molten metal (about 700° C. in the case of aluminum), and firmly holds the port liner body 1' by its reaction force. As a result, a buffer layer is formed around the outer peripheral surface of the insert-cast port liner body 1' through expansion of the ceramic sheet, which prevents the port liner body 1' from being broken due to shrinkage force generated when the metal solidifies. As mentioned above, since the ceramic sheet 8 also firmly holds the port liner body 1', the phenomenon that the port liner body 1' locally peels from the insert-casting metal to concentrate tensile stress thereon can be prevented. The stress concentration is likely to occur particularly at the depressed portion of the outer peripheral surface of the port liner body 1', and is a major factor to cause cracking. According to the fifth aspect of the present invention, since the port liner body 1' is firmly held by a holding force as reaction in the expansion of the ceramic sheet, the port liner body 1' is prevented from cracking due to this stress concentration. According to the present invention, the buffer layer formed by irreversible expansion of the ceramic sheet 8 is extremely stable, it will not lose its elasticity due to high temperatures and vibrations of an engine under operation. Thus, the port liner body 1' will not peel off. Further, according to the present invention, since a layer having excellent thermal insulation is formed around the outer peripheral surface of the port liner body 1', temperature drop of exhaust gases can be effectively prevented.

As is clear from the foregoing explanation, the fifth aspect of the present invention has many merits that it can of course fully exhibit heat insulating effects of port liner themselves, can completely prevent breakage due to compression stress during insert-casting, is free from peeling-off during use, and facilitates insert-casting. Thus, since the present invention provides ceramic port liners which solve the problems possessed by the prior art techniques, the invention has a great practical value.

What is claimed is:

1. A ceramic material to be insert-cast, consisting essentially of:
    40–58 wt % Al$_2$O$_3$, 38.7–60 wt % TiO$_2$, and not greater than 8 wt % of at least one material selected from the group consisting of SiO$_2$, MgO, and Fe$_2$O$_3$; and
    a primary crystalline phase consisting of at least 65 vol % of aluminum titanate and at least one secondary crystalline phase selected from the group consisting of rutile, covundum, and mullite, said crystalline phases having crystals with an average diameter of not less than 10 microns;
    wherein said ceramic material is produced by sintering at a temperature of not less than 1,550° C. and has a Young's modulus of 50–1470 kgf/mm$^2$, a compression strength of 5–40 kgf/mm$^2$, an average coefficient of thermal expansion in a temperature range of 40°–800° C. of not greater than 2.0×10$^{-6}$° C., and a porosity of 5–35%.

2. A ceramic material according to claim 1, wherein a thermal conductivity of said ceramic material is in a range of $0.8 \times 10^{31\ 3} - 5.0 \times 10^{-3}$ cal/cm.sec°C.

3. A ceramic material according to claim 1, wherein Young's modulus is in a range ob 50-200 kgf/mm$^2$.

4. A ceramic material to be insert-cast, consisting essentially of:

40-58 wt % $Al_2O_3$, 38.7-60 wt % $TiO_2$, and not greater than 8 wt % of at least one material selected from the group consisting of $SiO_2$, MgO, $Fe_2O_3$; and a primary crystalline phase consisting of at least 65 vol % of aluminum titanate having crystals with an average diameter of not less than 10 microns;

wherein said ceramic material is produced by sintering at a temperature of not less than 1,550° C. and has a Yound's modulus of 50-1470 kgf/mm$^2$, a compression strength of 5-40 kgf/mm$^2$, an average coefficient of thermal expansion in a temperature range of 40°-800° C. of not greater than $2.0 \times 10^{-6}$/°C., and a porosity of 5-35%.

* * * * *